United States Patent
Colonnese et al.

(10) Patent No.: US 10,705,606 B1
(45) Date of Patent: Jul. 7, 2020

(54) TRACKING SENSOR INTEGRATION SYSTEM AND METHOD FOR RECURSIVE ESTIMATION OF POSE OF USER'S BODY PART

(71) Applicant: Facebook Technologies, LLC, Menlo Park, CA (US)

(72) Inventors: Nicholas Colonnese, Seattle, WA (US); Justin Clark, Kirkland, WA (US); Sean Jason Keller, Kirkland, WA (US); Tristan Thomas Trutna, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 153 days.

(21) Appl. No.: 16/001,849

(22) Filed: Jun. 6, 2018

Related U.S. Application Data (60) Provisional application No. 62/576,008, filed on Oct. 23, 2017.

(51) Int. Cl.
*G06F 3/01* (2006.01)
*G02B 27/01* (2006.01)
(Continued)

(52) U.S. Cl.
CPC .......... *G06F 3/014* (2013.01); *G02B 27/0172* (2013.01); *G06F 3/0346* (2013.01);
(Continued)

(58) Field of Classification Search
CPC ............... G06F 1/163; G06F 1/1694; G06F 2203/0381; G06F 3/01; G06F 3/011;
(Continued)

(56) References Cited

U.S. PATENT DOCUMENTS

| 6,701,296 B1 * | 3/2004 | Kramer ............... A61B 5/6806 370/545 |
| 9,996,153 B1 * | 6/2018 | Trotta .................... G06F 3/017 |

(Continued)

OTHER PUBLICATIONS

A Sliding Window Approach to Natural Hand Gesture Recognition using a Custom Data Glove, Luzhnica et al., IEEE Symposium on 3D User Interfaces 2016, pp. 81-90. (Year: 2016).*

(Continued)

*Primary Examiner* — Keith L Crawley
(74) *Attorney, Agent, or Firm* — Fenwick & West LLP (57) ABSTRACT

A tracking sensor integration system presented herein collects sensor data obtained for each time frame by a plurality of sensors attached to a wearable garment placed on a user's hand. A controller coupled to the tracking sensor integration system calculates a measurement gain based at least in part on collected sensor data, and determines prediction for a pose of the user's hand for the current time frame using the collected sensor data and a plurality of estimation parameters for the current time frame. The controller then updates the estimation parameters for the current time frame, based in part on the measurement gain and the prediction for the pose of the user's hand. The controller determines an estimated pose for the user's hand, based in part on the updated estimation parameters and the collected sensor data.

20 Claims, 4 Drawing Sheets

(51) Int. Cl.
*G06F 3/0346* (2013.01)
*G06T 7/20* (2017.01)
*G06T 7/70* (2017.01)

(52) U.S. Cl.
CPC .................. *G06T 7/20* (2013.01); *G06T 7/70* (2017.01); *G02B 2027/0138* (2013.01)

(58) Field of Classification Search
CPC ........ G06F 3/014; G06F 3/017; G06F 3/0308; G06F 3/0325; G06F 3/0346; G06T 7/70; G06T 7/73; G06T 7/77; G06T 7/20; G06T 7/277; G02B 27/0172; G02B 2027/0138; A41D 19/0024; A41D 19/0027
See application file for complete search history.

(56) References Cited

U.S. PATENT DOCUMENTS

| | | | | |
|---|---|---|---|---|
| 10,274,318 B1* | 4/2019 | Sohn | ....................... | G01C 21/08 |
| 2013/0113704 A1* | 5/2013 | Sarrafzadeh | .......... | A63F 13/211 345/158 |
| 2015/0285835 A1* | 10/2015 | Karahan | ................. | G01P 21/00 73/1.38 |
| 2016/0055656 A1* | 2/2016 | Menozzi | ................. | G06F 1/163 345/633 |
| 2017/0053450 A1* | 2/2017 | Rodriguez | ........... | H04N 13/395 |

OTHER PUBLICATIONS

Sensor Data Fusion for full Arm Tracking using Myo Armband and Leap Motion, Silva et al., 2015 14th Brazilian Symposium on Computer Games and Digital Entertainment, pp. 128-134. (Year: 2015).*

Hoseinnezhad, R. et al., "Calibration of Resolver Sensors in Electromechanical Braking Systems: A Modified Recursive Weighted Least-Squares Approach," IEEE Transactions on Industrial Electronics, Apr. 2007, pp. 1052-1060, vol. 54, No. 2.

Li, T.-H., "On Exponentially Weighted Recursive Least Squares for Estimating Time-Varying Parameters and its Application to Computer Workload Forecasting," In: Journal of Statistical Theory and Practice, Sep. 2008, pp. 339-354, vol. 2, No. 3.

* cited by examiner

TRACKING SENSOR INTEGRATION SYSTEM AND METHOD FOR RECURSIVE ESTIMATION OF POSE OF USER'S BODY PART

CROSS-REFERENCE TO RELATED APPLICATIONS

This application claims benefit of U.S. Provisional Patent Application Ser. No. 62/576,008, filed Oct. 23, 2017, which is hereby incorporated by reference in its entirety.

BACKGROUND

The present disclosure generally relates to sensor devices, and specifically relates to a tracking sensor integration system configured to estimate a pose of a user's hand for use in artificial reality systems.

An artificial reality system is a simulated environment created by computer technology and presented to a user, such as through a head-mounted display (HMD) system. Typically, a HMD system includes a HMD headset that provides visual and audio information to the user. Conventional HMD systems create virtual hands of the user in the simulated environment and use a hand tracking system to track motion and positions of the user's hands. However, many conventional hand tracking systems are based on optical systems, and such systems may not capture accurate poses of user's hands.

To estimate a pose of a user's hand with a high accuracy, an optical estimate may be fused with a stretch sensor estimate, and possibly with estimates obtained by other sensors such as an inertial measurement unit (IMU), wherein these various types of tracking sensors are attached to an instrumented (fabric) glove or some other wearable garment placed on the user's hand. To obtain an accurate estimate of the pose of the user's hand using sensor data acquired by the various tracking sensors attached to the instrumented glove, the attached sensors may need to be first calibrated before applying any estimation algorithm on the acquired sensor data. However, this approach can be challenging for a number of reasons including sensor nonlinearity and drift, shifting of the instrumented glove on the hand, noisy (or non-valid at some time frames) ground truth data, and so on.

SUMMARY

A wearable garment with a tracking sensor integration system is presented herein. The tracking sensor integration system includes a plurality of sensors that may be attached to the wearable garment, and a controller interfaced with the plurality of sensors. In some embodiments, the controller is attached to the wearable garment. In other embodiments, the controller is part of a console, a head-mounted display (HMD) headset or some other processing device separate from the wearable garment. The wearable garment may be placed on a user's hand covering, e.g., fingers, a palm, a wrist, and at least a portion of an arm. In some embodiments, the wearable garment is implemented as a fabric glove. In some other embodiments, wearable garment may be placed on a portion of a user's body other than a user's hand.

The plurality of sensors of the tracking sensor integration system are configured to obtain sensor data for each time frame. For a current time frame, the controller collects the sensor data from the plurality of sensors, calculates a measurement gain for the current time frame based in part on the collected sensor data, determines prediction for a pose of the user's hand for the current time frame using the collected sensor data and a plurality of estimation parameters for the current time frame, and updates the estimation parameters for the current time frame, based in part on the measurement gain and the prediction for the pose of the user's hand. The controller then determines an estimated pose for the user's hand, based in part on the updated estimation parameters and the collected sensor data.

An artificial reality system can further integrate the wearable garment with the tracking sensor integration system. The artificial reality system can further include a HMD headset and a HMD console. The HMD headset displays content to the user. The HMD headset includes an electronic display and an optical assembly. The electronic display is configured to emit image light. The optical assembly is configured to direct the image light to a user's eye-box corresponding to a location of the user's eye. The HMD console can be coupled to the tracking sensor integration system and the HMD headset. In some embodiments, the tracking sensor integration system provides information about the estimated pose of the user's hand to the HMD console. The HMD headset updates a visual presentation of a virtual hand on the electronic display based on information about the estimated pose obtained from the HMD console.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments of the present disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

A wearable garment with a tracking sensor integration system is presented herein. The wearable garment may be placed on a portion of a user's body, e.g., on a hand of a user of an artificial reality system. The wearable garment may cover some or all of fingers, a palm, a wrist, and/or at least a portion of an arm of the user's hand. The tracking sensor integration system includes various different hand tracking sensors attached to the wearable garment, and a controller interfaced with the plurality of sensors. The controller may be implemented on the wearable garment. Alternatively, the controller may be implemented on a device separate from the wearable garment, e.g., a HMD console, a HMD headset, a mobile handheld device, etc. The tracking sensor integration system (e.g., via the controller) receives sensor inputs from the plurality of different hand tracking sensors, e.g., optical sensors, magnetic sensing sensors, radio frequency (RF) based sensors, an inertial measurement unit (IMU), etc. The tracking sensor integration system (e.g., via the controller) collects data from the various tracking sensors and weighs the data in accordance with a predicted accuracy of an estimation algorithm. The tracking sensor integration system (e.g., via the controller) determines an estimate of a pose for the user's hand using the weighted data applied to the estimation algorithm.

In some embodiments, the wearable garment is implemented as a fabric glove where the various tracking sensors are attached to. The fabric glove may be implemented to cover one or more fingers, a palm, and a wrist of the user's hand. In some embodiments, the fabric glove may also cover at least a portion of an arm of the user's hand. In some other embodiments, the wearable garment is implemented and designed for placement on some other portion of a user's body, e.g., a head, a leg, foot, etc.

In some embodiments, the tracking sensor integration system is integrated into an artificial reality system that includes a HMD headset and a HMD console. The HMD headset displays content to the user. The HMD headset includes an electronic display and an optical assembly. The electronic display is configured to emit image light. The optical assembly is configured to direct the image light to a user's eye-box corresponding to a location of the user's eye. The HMD console can be coupled to the tracking sensor integration system and the HMD headset. In some embodiments, the tracking sensor integration system provides information about the estimated pose of the user's hand (or some other portion of user's body) to the HMD console. The HMD headset updates a visual presentation of a virtual hand on the electronic display based on information about the estimated pose obtained from the HMD console.

Figure 1:
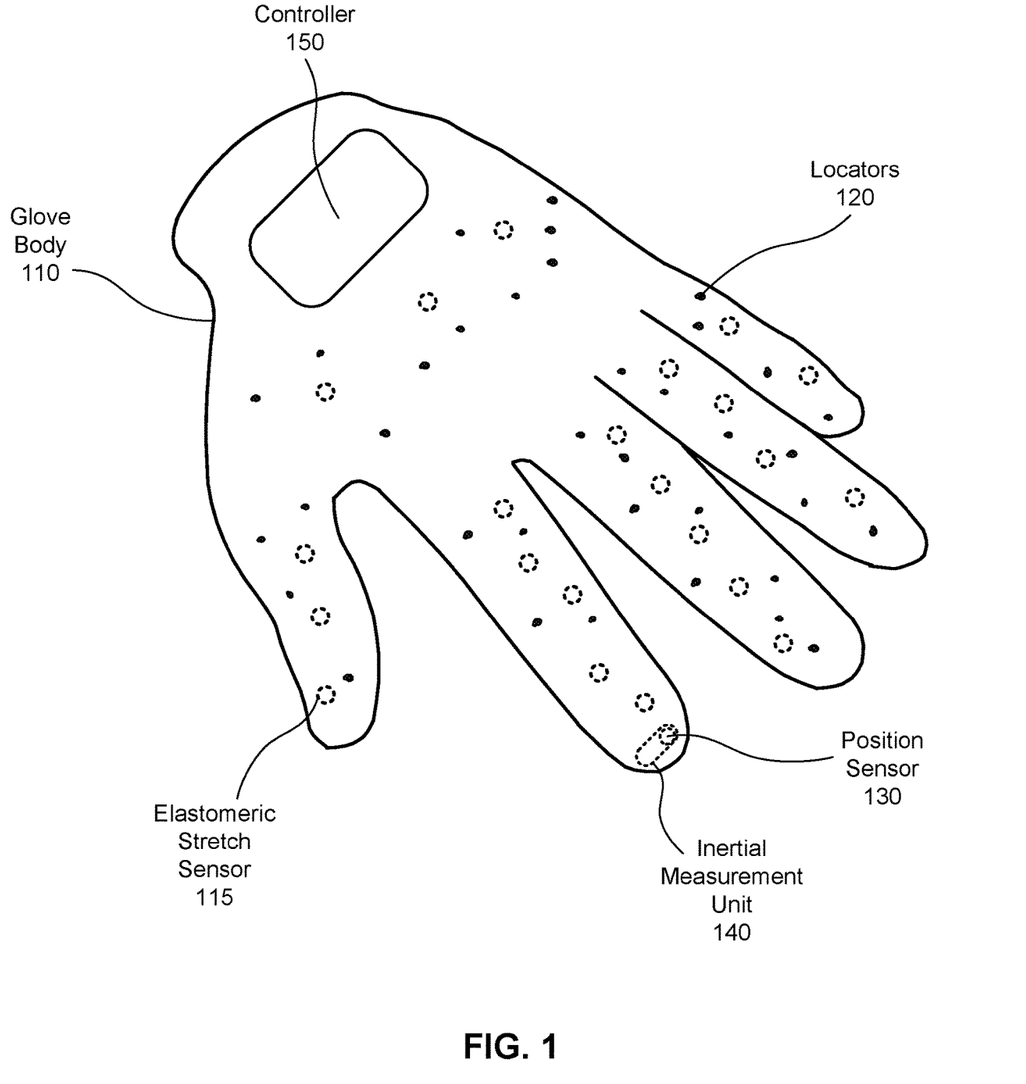
FIG. 1 is a perspective view of a fabric glove with a plurality of sensors for tracking a position and a pose of a user's hand, in accordance with one or more embodiments.

FIG. 1 is a perspective view of a wearable garment implemented as a fabric glove 100 instrumented with a plurality of sensors for tracking a position and a pose of a user's hand, in accordance with an embodiment. The fabric glove 100 includes a glove body 110, elastomeric stretch sensors 115, locators 120, a position sensor 130, an inertial measurement unit (IMU) 140, and a controller 150. In other embodiments, the fabric glove 100 comprises additional or fewer elements than those described herein. For example, the fabric glove 100 may include other types of sensors, such as optical sensors (e.g., based on retro reflective elements), magnetic sensors, RF based sensors, some combination thereof, etc. Similarly, the functions can be distributed among the elements and/or different entities in a different manner than is described here. For example, in some embodiments, the controller 150 may be located on a HMD console of an artificial reality system that further includes a HMD headset (not shown in FIG. 1). In other embodiments, the controller 150 may be implemented as part of the HMD headset. In yet other embodiments, the controller 150 is implemented on some other processing device, such as a mobile handheld device wirelessly interfaced with one or more components of the artificial reality system.

The glove body 110 is an apparatus covering a hand. The glove body 110 is a portion of a wearable garment that is coupled to the elastomeric stretch sensors 115, the locators 120, the position sensor 130, the IMU 140, and the controller 150. In one embodiment, the position sensor 130 is coupled to a corresponding tip of the glove body 110 (e.g., a portion corresponding to a fingertip); and the controller 150 is coupled to a portion of the glove body 110 corresponding to a back of a hand (e.g., dorsal side). In one embodiment, one or more of these components are placed beneath an outer surface of the glove body 110, thus are not visible from the outside. Additionally or alternatively, some of these components are placed on an outer surface of the glove body 110, and are visually detectable.

The glove body 110 illustrated in FIG. 1 is merely an example, and in different embodiments, the glove body 110 includes fewer, more or different components than shown in FIG. 1. In addition, in other embodiments, there may be multiple position sensors 130 provided. In other embodiments, the controller 150 is coupled to a different portion of the glove body 110 corresponding to, for example, a wrist or a palm.

The elastomeric stretch sensors 115 are sensor elements that measure changes in electric capacitance and/or resistance caused by bending, stretching, or an applied pressure. In some embodiments, the elastomeric stretch sensors 115 may be positioned along portions of the glove body 110 corresponding to one or more fingers. A number of elastomeric stretch sensors 115 per each finger can vary, e.g., based on a length of a finger. Alternatively or additionally, the elastomeric stretch sensors 115 may be positioned in other portions of the glove body 110, such as a wrist or a palm. Each elastomeric stretch sensor 115 is made of an elastic fabric having capacitance and/or resistance varying based on bending, stretching, or an applied pressure. In some embodiments, the elastomeric stretch sensors 115 can be implemented as strain gauge bend sensors and configured to measure changes in resistance. Alternatively, the elastomeric stretch sensors 115 can be implemented as capacitive stretch sensors and configured to measure changes in capacitance. By measuring the capacitance and/or resistance changes, the elastomeric stretch sensors 115 can track changes in a position and/or a pose of at least a portion of a user's hand.

The locators 120 are objects located in specific positions on the glove body 110 relative to one another. A locator 120 may be a light emitting diode (LED), a corner cube reflector, a reflective marker, a type of light source that contrasts with an environment in which the fabric glove 100 operates, or some combination thereof. In embodiments where the locators 120 are active (i.e., an LED or other type of light emitting device), the locators 120 may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof. In some embodiments, a locator 120 can be implemented as a retro reflector for acquiring optical sensing data. Design of locator 120 as the retro reflector may be combined with implementation of an elastomeric stretch sensor 115 that acquires stretch sensing data. The controller 150 may be then configured to combine the optical sensing data acquired by one or more locators 120 and the stretch sensing data acquired by one or more elastomeric stretch sensors 115, e.g., for estimating a pose of the glove body 110 and of at least a portion of the user's hand.

The position sensor 130 generates one or more measurement signals in response to a motion of the fabric glove 100. The position sensor 130 may be located external to the IMU 140, internal to the IMU 140, or some combination thereof. The position sensor 130 generates the one or more measurement signals in a manner different than the elastomeric stretch sensors 115. Examples of the position sensor 130 include: an accelerometer, a gyroscope, a magnetometer, another suitable type of sensor that detects motion, a type of sensor used for error correction of the IMU 130, or some combination thereof. In some embodiments, a plurality of position sensors 130 can be integrated into the glove body 110.

The IMU 140 is an electronic device that generates IMU data. Based on the one or more measurement signals from at least one elastomeric stretch sensor 115 and/or at least one position sensor 130, the IMU 140 generates IMU data indicating an estimated position of the fabric glove 100 relative to an initial position of the fabric glove 100.

The controller 150 collects measurement data acquired by various tracking sensors attached to the glove body 110, e.g., the elastomeric stretch sensors 115, the locators 120, the position sensor 130, and/or the IMU 140. The controller 150 may be coupled with the tracking sensors through a wired or wireless connection (not shown in FIG. 1). The controller 150 may weigh the collected measurement data in accordance with a predicted accuracy of estimating a pose of a user's hand. The controller 150 may determine an estimated pose for the user's hand based on the weighted data using an estimation algorithm presented in this disclosure. The predicted accuracy of estimating the pose of user's hand may represent an external sensor accuracy, i.e., how well sensor's data fits an internal data model. For example, external sensor accuracy can be measured based on how well the vision data's model fits associated sensor data. This "external sensor" represents the "reference" that the estimation algorithm presented herein is trained on, and the "reference" is available at a specific time periods.

The estimation algorithm presented in this disclosure can be used to calibrate the various tracking sensors instrumented on the fabric glove 100. The estimation algorithm can be further used to estimate a pose of a user's hand using measurement data obtained from the calibrated sensors. The measurement data may represent ground truth data that can be noisy and intermittently available. In some embodiments, the ground truth data can represent sensor data acquired by one or more external sensors, e.g., by a depth camera external to the fabric glove 100. The estimation algorithm maps an arbitrary number of sensor inputs (measurements) into a single output, i.e., an estimated pose of a user's hand. The estimation algorithm presented herein can be referred to as an adaptive weighted recursive least squares (AWRLS) estimation algorithm.

The AWRLS estimation algorithm is adaptive, i.e., the AWRLS estimation algorithm handles a plurality of estimation parameters changing in time, e.g., to accommodate the fabric glove 100 shifting on the user's hand. The AWRLS estimation algorithm is weighted, i.e., the AWRLS estimation algorithm naturally propagates a confidence of ground truth data to the estimated output (pose). The AWRLS estimation algorithm is recursive because each time frame requires data of only a previous time frame and no matrix inversion is applied. The AWRLS estimation algorithm has a least-squares objective function, i.e., the AWRLS estimation algorithm solves an estimate based on a sum of squares of residuals (which represents l2 norm). Furthermore, the AWRLS estimation algorithm is unbiased and generates a preferred output (i.e., estimated pose) if regressors describe the true relationship between an input of the AWRLS estimator and an output of the AWRLS estimator subject to uncorrelated noise. The regressors of the AWRLS estimator actually describe mapping of raw sensor inputs into a measured output. In some embodiments, a set of regressors used for the AWRLS estimation algorithm are determined analytically. In other embodiments, a set of regressors used herein are determined experimentally. In yet other embodiments, a set of regressors used herein are chosen without any prior information. In one embodiment, the regressors can be determined based on a method that does not require any model or any testing and includes variety of regressors. The AWRLS estimation algorithm may select "correct" regressors, but convergence may be slower. In another embodiment, the regressors can be determined based on a method that utilizes testing to determine the correct form of the regressors. However, optimization variables for each regressor may still be unknown.

The AWRLS estimation algorithm presented in this disclosure is computationally efficient, fast, suitable for implementation, and provides a preferred output result (i.e., estimated pose). Details about the AWRLS estimation algorithm for determining an estimated pose for a user's hand (or some other portion of user's body) are described below and in conjunction with FIGS. 2-3.

Figure 2:
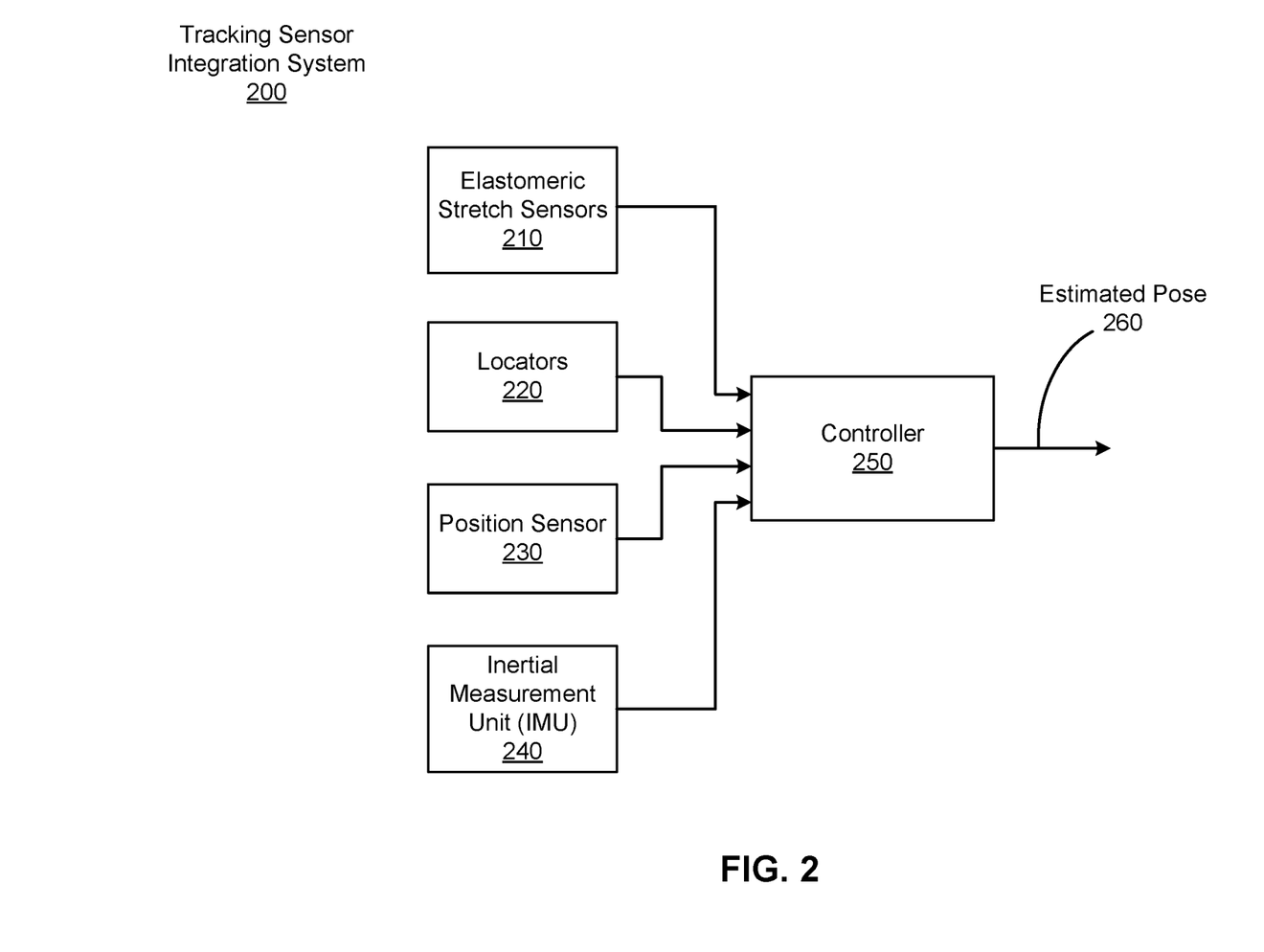
FIG. 2 is a block diagram of a tracking sensor integration system, which may be implemented on the fabric glove in FIG. 1, in accordance with one or more embodiments.

FIG. 2 is a block diagram of a tracking sensor integration system 200, in accordance with an embodiment. The tracking sensor integration system 200 includes elastomeric stretch sensors 210, locators 220, a position sensor 230, an IMU 240, and a controller 250. In other embodiments, the tracking sensor integration system 200 comprises additional or fewer elements than those described herein. The elastomeric stretch sensors 210, the locators 220, the position sensor 230, and the IMU 240 may be implemented on a wearable garment, e.g., the fabric glove 100. In some embodiments, the controller 250 is implemented on the wearable garment. Alternatively, the controller 250 can be implemented on a HMD console, a HMD headset, or some other processing device separate from the wearable garment. In some embodiments, the configurations and operations of the elastomeric stretch sensors 210, the locators 220, the position sensor 230, the IMU 240, and the controller 250 are similar to the elastomeric stretch sensors 115, the locators 120, the position sensor 130, the IMU 140, and the controller 150 shown in FIG. 1.

The controller 250 may collect data from various tracking sensors, i.e., the elastomeric stretch sensors 210, the locators 220, the position sensor 230 and/or the IMU 240. The controller 250 may then weigh the collected data in accordance with a predicted accuracy of the AWRLS estimation algorithm. The controller 250 may determine an estimated pose 260 of a user's hand by applying the AWRLS estimation algorithm on the weighted collected data. In some embodiments, information about the estimated pose 260 can be then provided to a HMD console (not shown in FIG. 2). A HMD system may then update a visual presentation of a virtual hand in a simulated environment based on information about the estimated pose 260 obtained from the console. Details about operations of the controller 250 related to collecting measurement data acquired by the various tracking sensors over a plurality of time frames and determining the estimated pose 260 are described below in conjunction with details of the AWRLS estimation algorithm.

In some embodiments, the controller 250 determines the estimated pose 260 as a single output for each time frame ŷ∈R (e.g., a joint angle of a kinematic model of a user's hand), using sensor data values obtained by p∈N tracking sensors. For example, the obtained sensor data values may comprise elastomeric capacitance values and/or elastomeric resistance values acquired by the elastomeric stretch sensors 210. In addition, the obtained sensor data values may comprise positional data acquired by the locators 220, the position sensor 230, and/or the IMU 240. At each time frame (i.e., at a defined period of time), sensor data values, an estimate of the ground truth output, y∈R, and a confidence or data sample weight for each sensor data value, w∈R⁺, are available at the controller 250. The controller 250 determines an estimate of y, ŷ using an affine estimator, i.e., $$\hat{y} = A \cdot x, \quad (1)$$

where $A \in R^{m \times n}$ is a matrix of regressors of the estimator, i.e., $$A = [\overline{1} s_1 s_1^2 s_2 \sqrt{s_2} \ldots s_p s_p^2], \quad (2)$$

$x \in R^n$ is a vector of the estimation parameters, $\overline{1}$ is a vector of all ones, $s_j \in R^m$ is a vector of the sensor data values acquired by a sensor $j$, $j=1, \ldots, p$, $m \in N$ is a number of time frames, and $n \in N$ is a number of estimation parameters and a number of regressors. Note that the estimator defined by equation (1) can be the AWRLS estimator applied recursively for each time frame, as described in more details below. Also note that the regressor columns forming the matrix of regressors in equation (2) are functions of the sensor data values, and can be completely general. Squares and square roots in equation (2) are only examples of transformations of the sensor data values one could use. Other transformations of the sensor data values can be used to obtain the regressor columns. In some embodiments, the regressors describe direct relation between the input (sensor data) and output (estimated pose), as discussed below in conjunction with algorithm optimality. In some embodiments, it is beneficial to describe the rows of the regressor matrix A, i.e., $$A = \begin{bmatrix} a_1^T \\ a_2^T \\ \vdots \\ a_m^T \end{bmatrix}, \quad (3)$$

where $a_i^T$ is the i-th row of the regressor matrix A defined by equation (2), i=1, . . . , m. Note that each row of the regressor matrix $a_i^T$ is related to a different time frame i.

Preferred values of the estimation parameters, x*, are given by:

$$x^* = \mathrm{argmin}_x \left( \sum_i^m (\hat{y}_i - y_i)^2 \right) = \mathrm{argmin}_x \left( \sum_i^m \lambda^{g(i,m)} w_i (a_i^T x - y_i)^2 \right), \quad (4)$$

where $\lambda \in [0,1]$ is a "forgetting factor" (i.e., a smaller value relates to weighting more recent values stronger, and vice versa), $g^{(i,m)}$ is a factor that determines how newer frames are weighted relative to past frames, and $w_i$ is a weight applied to the i-th row, $a_i^T$, of the regressor matrix A. In one or more embodiments, $g^{(i,m)}$ is geometric, i.e., $g^{(i,m)} = m - i$.

In some embodiments, to solve for the preferred estimation parameters x* given by equation (4), the controller 250 may gather data from the various tracking sensors during an initial phase or "a calibration phase." After the calibration phase is completed, the controller 250 generates the estimation parameters x* in one step using sensor data values acquired during multiple time frames. This approach for obtaining the preferred estimation parameters defined by equation (4) can be referred to as the "batch solution." In accordance with the "batch solution," the preferred estimation parameters x* can be obtained as:

$$x^* = (A W \Lambda A)^{-1} A^T W \Lambda \cdot y, \quad (5)$$

where $W \in R^{n \times n}$ is a diagonal matrix, i.e., $$W(i,i) = w_i, \quad (6)$$

and $\Lambda \in R^{n \times n}$ is a diagonal matrix, i.e., $$\Lambda(i,i) = \lambda^{g(i,m)} = \lambda^{m-i}. \quad (7)$$

Note that the "batch solution" approach cannot dynamically update the estimation parameters for each time frame basis after the calibration phase is completed. In addition, the "batch solution" approach is computationally intensive as the "batch solution" involves calculating the inverse of a matrix, as given by equation (5).

In some embodiments, the controller 250 is configured to recursively solve for the preferred estimation parameters x* defined by equation (4), i.e., the controller 250 is configured to constantly update the preferred values of estimation parameters x* at each time frame, which represents one recursive step. The recursive approach includes the calibration phase that represents a time period required for optimization variables to reach steady state. The recursive approach removes a compute time and memory needed to find the optimization variables in a "batch" fashion. Thus, the recursive step allows a much lower compute than the batch compute of equation (5). The recursive approach can also accommodate changes in the estimation parameters over time, e.g., slipping of the glove 100 on the hand from one time frame to another. Note that the solution of the recursive approach is identical to the solution of the batch approach given by equation (5), although the recursive approach is computationally less intensive and requires storage of much smaller amount of data. The controller 250 that recursively computes the preferred estimation parameters x* may store information that is only related to a time frame that immediately precedes a currently processed time frame. Thus, the recursive approach does not require storing a large amount of acquired sensor data values related to multiple time frames. Note that the information related to the time frame immediately preceding the currently processed time frame may be stored in an internal memory of the controller 250 or in a memory external to the controller 250 (not shown in FIG. 2). Furthermore, the computational complexity of the recursive approach is less than that of the batch approach as the recursive approach does not involve a matrix inversion unlike the batch approach.

Because the estimation algorithm is recursive, the controller 250 may be configured to predetermine an initial seed for the estimation parameters and another initial seed for a measurement covariance. In some embodiments, if no prior information is available for the estimation parameters, the controller 250 sets the initial seed for the estimation parameters and the other initial seed for the measurement covariance as:

$$x = \begin{bmatrix} 0 \\ 0 \\ \vdots \\ 0 \end{bmatrix}, \text{ and } P_0 = cI, \quad (8)$$

where $P_0 \in R^{n \times n}$ is an initial estimator (measurement) covariance, I is the identity matrix of size n, and $c \in R^+$ is a constant chosen to be an upper bound on the input signal variance (e.g., the stretch sensor noise variance) representing a variance of estimation parameters (optimization variables), i.e., $c \gg \sigma_x^2$. Note that the larger singular values of the measurement covariance P (i.e., larger values of c), the more numerically stable the recursive estimation will initially be. However, a larger value of c also increases a number of time frames required for the estimation parameters to converge, i.e., the recursive estimation algorithm becomes slower.

In some embodiments, after acquiring the sensor data values by the various tracking sensors for each time frame i (i=1, ..., m), the controller 250 generates (and stores) measurement data organized as a row of the matrix of regressors $a_i^T$, as defined in equation (3). After that, for each time frame, the controller 250 performs a recursive step to determine the estimation parameters associated with that time frame. During the recursive step, the controller 250 may perform several operations. First, the controller 250 computes a measurement gain for a current time frame i, $K \in R^n$, relative to a state prediction using the weighted measurement data and the measurement covariance as given by:

$$K = \left(\frac{1}{\lambda}\right) w_i P(a_i^T)^T \left[1 + \left(\frac{1}{\lambda}\right) w_i P(a_i^T)^T\right]^{-1}. \quad (9)$$

After that, the controller 250 calculates, for the current time frame i, a difference between the measurement (i.e., ground truth data) and prediction for a pose of a user's hand, i.e., innovation, $\alpha \in R$ defined by:

$$\alpha = y_i - (a_i^T)x \quad (10)$$

After calculating the innovation a for the current time frame, the controller 250 updates the estimation parameters for the current time frame based on the measurement gain and the innovation, as given by:

$$x = x + K\alpha. \quad (11)$$

The controller 250 then updates the normalized measurement covariance for the current time frame (to be used in a following time frame) using the measurement gain and the measurement data, as given by:

$$P = \left(\frac{1}{\lambda}\right) P - \left(\frac{1}{\lambda}\right) K(a_i^T) P. \quad (12)$$

After performing one or more recursive steps defined by equations (9)-(12) for one or more time frames, the controller 250 may determine the estimated pose 260 using the updated estimation parameters and a vector of regressors $a_f^T$ for a time frame f for which the estimated pose 260 (i.e., variable $\hat{y}_f \in R$) is being determined, i.e., $$\hat{y}_f = a_f^T x. \quad (13)$$

To analyze optimality of the determined estimation parameters, the following should be considered:

$$y_i = a_i^\tau x^\tau + e_i \text{ for } i=1,2,\ldots,m, \quad (14)$$

where $e_i$ is a random variable and $x^\tau$ represents the true optimization parameters. Let $\bar{e}$ be the vector of errors, i.e., $\bar{e} = [e_1, e_2, \ldots, e_m]^T$. It can be considered that the error is uncorrelated in time, and has variance at a time frame being equal to the weight squared, i.e., $$\text{cov}(\bar{e}) = \Sigma_e, \quad (15)$$

where $\Sigma_e \in R^{m \times m}$ is a diagonal matrix, i.e., $$\Sigma_e(i,i) = w_i^2 \lambda^{m-i}. \quad (16)$$

Then, the value of the estimation parameters obtained from the AWRLS estimator given by equation (4) is unbiased, i.e., $E[x^* - x^\tau] = 0$. Furthermore, the AWRLS estimator given by equation (4) represents the minimum variance unbiased estimator for all solutions of the estimation parameters x obtained using linear estimators, i.e., $\text{var}[x^*(A,y)] \leq \text{var}[x(A,y)]$.

Additionally, if the error $e_i$ is a Gaussian random variable, then the variable $x^*$ (i.e., one or more estimation parameters) is also Gaussian. In this case, the solution of AWRLS estimation algorithm represents the minimum mean square estimator, i.e., $x^* = \arg\min_x \|x - x_r\|$. Also, the solution of AWRLS estimation algorithm represents maximum a posteriori (MAP) estimator, i.e., $x^* = \arg\min_x P(x^\tau | (A,y))$. Therefore, if the regressors describe the true relationship between the sensors and the measurements, and the error is uncorrelated in time, then AWRLS estimator provides a preferred solution.

Figure 3:
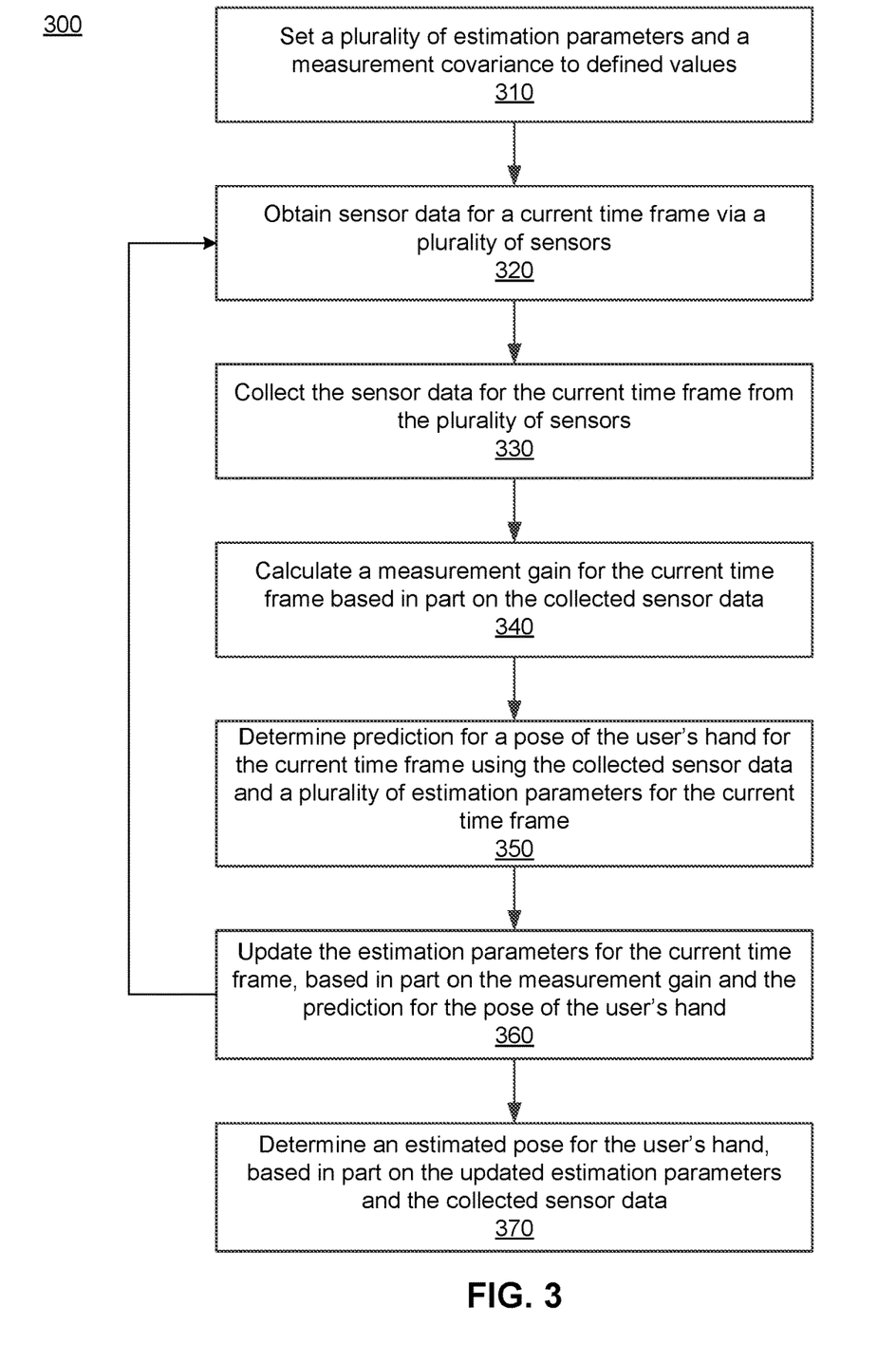
FIG. 3 is a flow chart illustrating a process of estimating a pose of a user's hand, in accordance with one or more embodiments.

FIG. 3 is a flow chart illustrating a process 300 of estimating a pose of a portion of a user's body (e.g., user's hand), which may be implemented at the tracking sensor integration system 200 shown in FIG. 2, in accordance with an embodiment. The process 300 of FIG. 3 may be performed by the components of a system (e.g., the tracking sensor integration system 200). Other entities (e.g., a HMD and/or console) may perform some or all of the steps of the process in other embodiments. Likewise, embodiments may include different and/or additional steps, or perform the steps in different orders.

The system sets (initializes) 310 (e.g., via a controller) a plurality of estimation parameters and a measurement covariance to defined values. In some embodiments, the plurality of estimation parameters are set to values of the estimation parameters determined during estimation of a previous pose of a portion of user's body, e.g., user's hand. In some other embodiments, the plurality of estimation parameters are set to all zeroes, if no prior information is available for the estimation parameters. In some embodiments, the measurement covariance is set to a value much larger than an input variance in order to achieve numerical stability of the estimation algorithm.

The system obtains 320 sensor data for a current time frame via a plurality of sensors. The sensors may be attached to a wearable garment (e.g., a fabric glove) placed on a user's hand. In some embodiments, the plurality of sensors include different hand tracking sensors, e.g., optical sensors, magnetic sensors, RF based sensors, IMU, strain gauge bend sensors, capacitive stretch sensors, some combination thereof, etc. In some embodiments, the system (e.g., the controller) forms a matrix of regressors using the obtained sensor data, e.g., in accordance with equation (2). The system (e.g., the controller) may store measurement data in the form of one or more rows of the matrix of regressors, e.g., as defined in equation (3).

The system collects 330 (e.g., via the controller) the sensor data for the current time frame from the plurality of sensors. In some embodiments, the system determines a plurality of weights based on a defined accuracy of estimating the pose of the user's hand, and applies the weights to the collected sensor data to obtain weighed sensor data. For example, a larger weight is assigned to the sensor data that have higher validity (higher confidence), and vice versa.

The system calculates 340 (e.g., via the controller) a measurement gain for the current frame based in part on the collected sensor data. The system may calculate the measurement gain based in part on the weighted sensor data. The system may update the measurement covariance based in part on the measurement gain and the collected sensor data, e.g., as defined by equation (12). The system may then update the measurement gain for a time frame following the current time frame, based on the updated measurement covariance and sensor data collected by the plurality of sensors during the time frame following the current time frame. In some embodiments, the system calculates 340 the measurement gain in accordance with equation (9).

The system determines 350 (e.g., via the controller) prediction for a pose of the portion of the user's body (e.g., user's hand) for the current time frame using the collected sensor data and a plurality of estimation parameters for the current time frame. The system may determine measurement data related to the pose of the user's hand using the collected sensor data, and calculate a difference (i.e., innovation, $\alpha$) between the measurement data and the prediction for the pose of the user's hand, e.g., in accordance with equation (10). The system may determine a vector of regressors for the current time frame based on the collected sensor data for the current time frame. The system may then determine the prediction for the pose of the user's hand for the current time frame, based on the vector of regressors for the current time frame and a plurality of estimation parameters for the current time frame.

The system updates 360 (e.g., via the controller) a plurality of estimation parameters for the current time frame, based in part on the measurement gain and the prediction for the pose of the portion of the user's body (e.g., user's hand). The system may update the estimation parameters for the current time frame based on the measurement gain and the difference (i.e., innovation, a) between the measurement data and the prediction for the pose of the user's hand. In some embodiments, the controller calculates the updated estimation parameters in accordance with equation (11). The system may replace, in a memory of the system, information about the estimation parameters for a time frame preceding the current time frame with information about the updated estimation parameters for the current time frame. The system may further replace, in the memory, information about sensor data collected by the plurality of sensors elements during a time frame preceding the current time frame with information about the sensor data collected during the current time frame.

The system performs steps 320-360 recursively, i.e., the steps 320-360 represent one recursive iteration of the estimation algorithm for the current time frame. In some embodiments, for each time frame, i.e., for each recursive iteration, the system determines 370 (e.g., via the controller) an estimated pose for the portion of the user's body (e.g., user's hand), based in part on the updated estimation parameters and the collected sensor data. The system may determine the estimated pose for the user's hand, based on the updated estimation parameters and the vector of regressors. The system may provide information about the estimated pose for the user's hand to a HMD console for updating a visual presentation of the user's hand on an electronic display of a HMD. In other embodiments, the system determines 370 (e.g., via the controller), after a predetermined number of time frames, an estimated pose of the hand using the updated estimation parameters and the sensor data acquired during a current time frame. In some embodiments, the controller determines 370 the estimated pose of the hand by using a vector of regressors $a_f^T$ for a time frame f for which the estimated pose is determined and the updated estimation parameters, e.g., as defined by equation (13). The controller may calculate the vector of regressors $a_f^T$ for the time frame f, e.g., in accordance with equation (2) and equation (3).

System Environment

Figure 4:
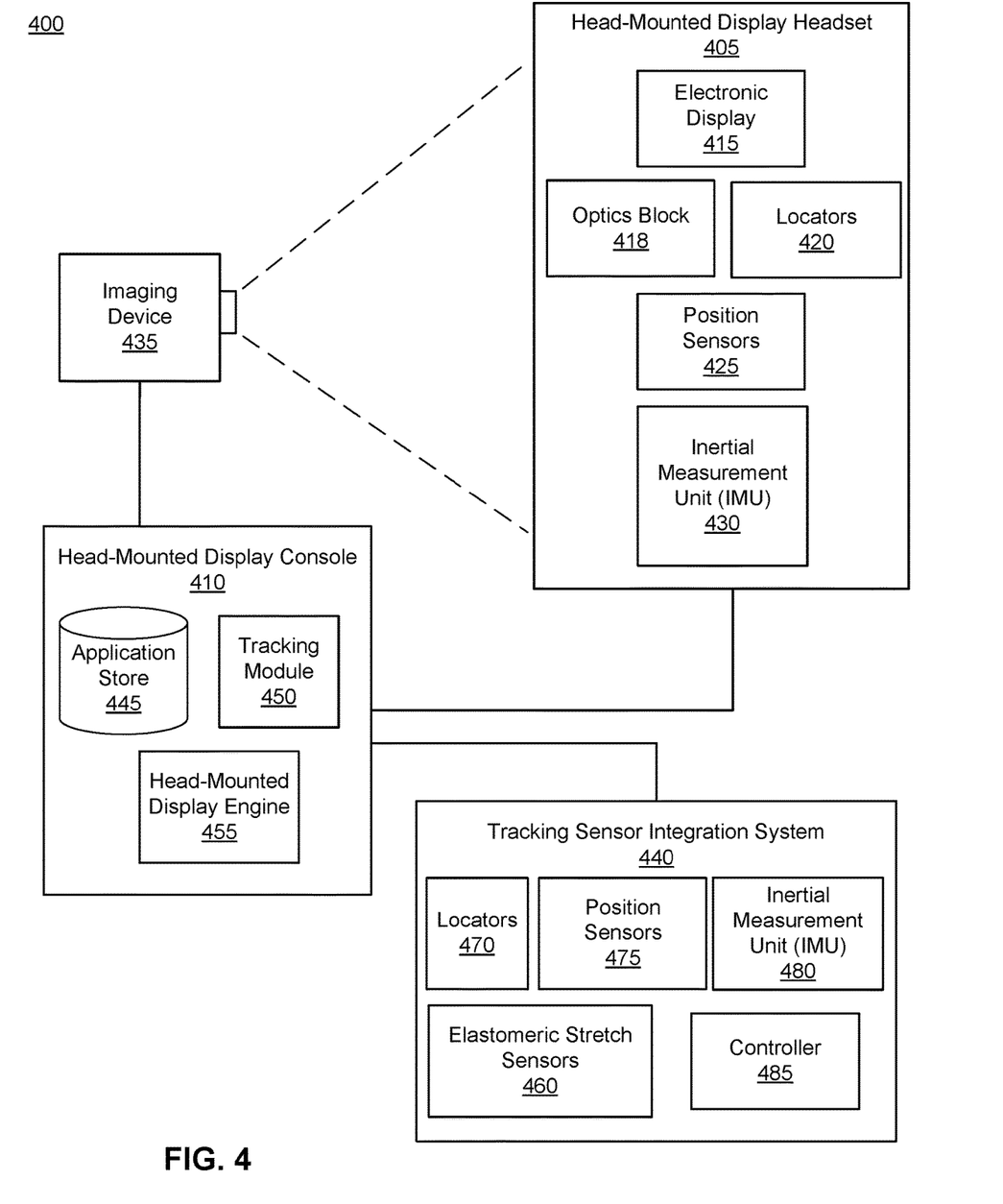
FIG. 4 is a block diagram of a system environment including a head-mounted display (HMD) system, in accordance with one or more embodiments.

FIG. 4 is a block diagram of a HMD system 400 in which a HMD console 410 operates. The HMD system 400 may be for use as an artificial reality system. The HMD system 400 shown by FIG. 4 comprises a HMD headset 405, a HMD console 410, an imaging device 435, and a tracking sensor integration system 440. While FIG. 4 shows an example system 400 including one HMD headset 405, one imaging device 435, and one tracking sensor integration system 440, in other embodiments any number of these components may be included in the HMD system 400. For example, there may be multiple HMD headsets 405 each having an associated tracking sensor integration system 440 and being monitored by one or more imaging devices 435, with each HMD headset 405, tracking sensor integration system 440, and imaging devices 435 communicating with the HMD console 410. In alternative configurations, different and/or additional components may be included in the system environment 400. Similarly, the functions can be distributed among the components in a different manner than is described here. For example, some or all of the functionality of the HMD console 410 may be contained within the HMD headset 405.

The HMD headset 405 may act as an artificial reality display. An MR and/or AR HMD augments views of a physical, real-world environment with computer-generated elements (e.g., images, video, sound, etc.). The HMD headset 405 presents content to a user. Example content includes images, video, audio, or some combination thereof. Audio content may be presented via a separate device (e.g., speakers and/or headphones) external to the HMD headset 405 that receives audio information from the HMD headset 405, the console 410, or both. The HMD headset 405 includes an electronic display 415, an optics block 418, one or more locators 420, one or more position sensors 425, and an IMU 430. The electronic display 415 displays images to the user in accordance with data received from the HMD console 410.

The optics block 418 magnifies received light from the electronic display 415, corrects optical errors associated with the image light, and the corrected image light is presented to a user of the HMD headset 405. An optical element may be an aperture, a Fresnel lens, a convex lens, a concave lens, a filter, or any other suitable optical element that affects the image light emitted from the electronic display 415. Moreover, the optics block 418 may include combinations of different optical elements. In some embodiments, one or more of the optical elements in the optics block 418 may have one or more coatings, such as antireflective coatings.

The locators 420 are objects located in specific positions on the HMD headset 405 relative to one another and relative to a specific reference point of the HMD headset 405. A locator 420 may be a light emitting diode (LED), a corner cube reflector, a reflective marker, a type of light source that contrasts with an environment in which the HMD headset 405 operates, or some combination thereof. In embodiments where the locators 420 are active (i.e., an LED or other type of light emitting device), the locators 420 may emit light in the visible band (~380 nm to 750 nm), in the infrared (IR) band (~750 nm to 1 mm), in the ultraviolet band (10 nm to 480 nm), some other portion of the electromagnetic spectrum, or some combination thereof.

In some embodiments, the locators 420 are located beneath an outer surface of the HMD headset 405, which is transparent to the wavelengths of light emitted or reflected by the locators 420 or is thin enough not to substantially attenuate the wavelengths of light emitted or reflected by the locators 420. Additionally, in some embodiments, the outer surface or other portions of the HMD headset 405 are opaque in the visible band of wavelengths of light. Thus, the locators 420 may emit light in the IR band under an outer surface that is transparent in the IR band but opaque in the visible band.

The IMU 430 is an electronic device that generates IMU data of the HMD headset 405 based on measurement signals received from one or more of the position sensors 425. A position sensor 425 generates one or more measurement signals in response to motion of the HMD headset 405. Examples of position sensors 425 include: one or more accelerometers, one or more gyroscopes, one or more magnetometers, another suitable type of sensor that detects motion, a type of sensor used for error correction of the IMU 430, or some combination thereof. The position sensors 425 may be located external to the IMU 430, internal to the IMU 430, or some combination thereof.

Based on the one or more measurement signals from one or more position sensors 425, the IMU 430 generates IMU data of the HMD headset 405 indicating an estimated position of the HMD headset 405 relative to an initial position of the HMD headset 405. For example, the position sensors 425 include multiple accelerometers to measure translational motion (forward/back, up/down, left/right) and multiple gyroscopes to measure rotational motion (e.g., pitch, yaw, and roll) of the HMD headset 405. In some embodiments, the IMU 430 rapidly samples the measurement signals and calculates the estimated position of the HMD headset 405 from the sampled data. For example, the IMU 430 integrates the measurement signals received from the accelerometers over time to estimate a velocity vector and integrates the velocity vector over time to determine an estimated position of a reference point of the HMD headset 405. Alternatively, the IMU 430 provides the sampled measurement signals to the HMD console 410, which determines the IMU data of the HMD headset 405. The reference point of the HMD headset 405 is a point that may be used to describe the position of the HMD headset 405. While the reference point of the HMD headset 405 may generally be defined as a point in space; however, in practice the reference point of the HMD headset 405 is defined as a point within the HMD headset 405 (e.g., a center of the IMU 430).

The IMU 430 receives one or more calibration parameters of the HMD headset 405 from the HMD console 410. As further discussed below, the one or more calibration parameters of the HMD headset 405 are used to maintain tracking of the HMD headset 405. Based on a received calibration parameter of the HMD headset 405, the IMU 430 may adjust one or more IMU parameters (e.g., sample rate). In some embodiments, certain calibration parameters of the HMD headset 405 cause the IMU 430 to update an initial position of the reference point of the HMD headset 405 so it corresponds to a next calibrated position of the reference point of the HMD headset 405. Updating the initial position of the reference point of the HMD headset 405 as the next calibrated position of the reference point of the HMD headset 405 helps reduce accumulated error associated with the determined estimated position. The accumulated error, also referred to as drift error, causes the estimated position of the reference point of the HMD headset 405 to "drift" away from the actual position of the reference point of the HMD headset 405 over time.

The tracking sensor integration system 440 determines an estimated pose of a user's hand, based on measurement data obtained by various tracking sensors. The configuration and operation of the tracking sensor integration system 440 is similar to the tracking sensor integration system 200 of FIG. 2. In one embodiment, various tracking sensors of the tracking sensor integration system 440 are integrated into a wearable garment (e.g., the fabric glove 100) through which the HMD console 410 can detect a user hand movement and create a virtual hand for presentation to a user. The tracking sensor integration system 440 includes elastomeric stretch sensors 460, locators 470, one or more position sensors 475, an IMU 480, and a controller 485, in accordance with an embodiment. In some embodiments, the elastomeric stretch sensors 460, the locators 470, the one or more position sensors 475, the IMU 480 are employed (e.g., by the controller 485) to determine a position or movement of the user's hand. In other embodiments, the tracking sensor integration system 440 contains additional or fewer components. For example, the tracking sensor integration system 440 does not contain an IMU 480, but the elastomeric stretch sensors 460, the locators 470 and the position sensors 475 provide positional data regarding the user's hand. In some embodiments, the controller 485 is integrated into the wearable garment. Alternatively, the controller 485 may be part of the HMD headset 405, the HMD console 410 or some other processing device separate from the wearable garment. In some embodiments, the tracking sensor integration system 440 provides the estimated data regarding a position and/or a pose of the user's hand to the HMD console 410. The HMD headset 405 may then update a visual presentation of a virtual hand displayed on the electronic display 415 based on the estimated data related to the position and/or the pose of the user's hand obtained from the HMD console 410.

In some embodiments, the tracking sensor integration system 440 estimates (e.g., via the controller 485) a position and a pose of the user's hand. The controller 485 may receive sensor inputs from a plurality of different hand tracking sensors, e.g., the elastomeric stretch sensors 460, the locators 470, the one or more position sensors 475, and the IMU 480. The controller 485 may collect data from the various tracking sensors and weight the data in accordance with a predicted accuracy of an estimation algorithm. The controller 485 may determine the pose for the user's hands using the weighted data using, e.g., the AWRLS estimation algorithm. Note that the configuration and operation of the controller 485 is similar to the controller 150 of FIG. 1 and to the controller 250 of FIG. 2.

The elastomeric stretch sensors 460 are sensor elements positioned along portions of a wearable garment (e.g., the fabric glove 100) corresponding to one or more fingers. Each elastomeric stretch sensor 460 can be made of elastic fabric with varying capacitance and/or resistance based on bending, stretching, or an applied pressure. The elastomeric stretch sensors 460 can be implemented as strain gauge bend sensors and configured to measure changes in resistance. Alternatively, the elastomeric stretch sensors 460 can be implemented as capacitive stretch sensors and configured to measure changes in capacitance. By measuring the capacitance and/or resistance changes, the elastomeric stretch sensors 460 can track changes in a position and/or a pose of at least a portion of a user's hand. The configuration and operation of the elastomeric stretch sensors 460 are similar to the elastomeric stretch sensors 115 of the fabric glove 100 of FIG. 1 and to the elastomeric stretch sensors 210 of the tracking sensor integration system 200 of FIG. 2.

The locators 470 are objects located in specific positions on the haptic assembly 440 relative to one another and relative to a specific reference point of a wearable garment (e.g., the fabric glove 100) where the tracking sensor integration system 440 in integrated. A locator 470 is substantially similar to a locator 420 except that a locator 470 is part of the tracking sensor integration system 440. Additionally, in some embodiments, the outer surface or other portions of the wearable garment where the tracking sensor integration system 440 is integrated are opaque in the visible band of wavelengths of light. Thus, the locators 470 may emit light in the IR band under an outer surface that is transparent in the IR band but opaque in the visible band. The configuration and operation of the locators 470 are similar to the locators of 120 of the fabric glove 100 of FIG. 1 and to the locators 220 of the tracking sensor integration system 200 of FIG. 2.

A position sensor 475 generates one or more measurement signals in response to motion of the wearable garment where various tracking sensors of the tracking sensor integration system 440 is integrated. The position sensors 475 are substantially similar to the positions sensors 425, except that the position sensors 475 are part of the tracking sensor integration system 440. The position sensors 475 may be located external to the IMU 480, internal to the IMU 480, or some combination thereof. The configuration and operation of the position sensor 475 is similar to the position sensor 130 of the fabric glove 100 of FIG. 1 and to the position sensor 230 of the tracking sensor integration system 200 of FIG. 2.

Based on the one or more measurement signals from the elastomeric stretch sensors 460 and/or one or more position sensors 475, the IMU 480 generates IMU data of the tracking sensor integration system 440 indicating an estimated position of the wearable garment (and the user's hand) relative to an initial position of the wearable garment. For example, the position sensors 475 include multiple accelerometers to measure translational motion (forward/back, up/down, left/right) and multiple gyroscopes to measure rotational motion (e.g., pitch, yaw, and roll) of the wearable garment (and the user's hand). In some embodiments, the IMU 480 rapidly samples the measurement signals and calculates the estimated position of the wearable garment from the sampled data. For example, the IMU 480 integrates the measurement signals received from the accelerometers over time to estimate a velocity vector and integrates the velocity vector over time to determine an estimated position of a reference point of the wearable garment. Alternatively, the IMU 480 provides the sampled measurement signals to the HMD console 410, which determines the IMU data of the wearable garment. The reference point of the wearable garment is a point that may be used to describe the position of the wearable garment. While the reference point of the wearable garment may generally be defined as a point in space; however, in practice the reference point of the wearable garment is defined as a point within the wearable garment (e.g., a center of the IMU 480).

The IMU 480 receives one or more calibration parameters of the tracking sensor integration system 440 from the HMD console 410. As further discussed below, the one or more calibration parameters of the tracking sensor integration system 440 are used to maintain tracking of the wearable garment and the user's hand. Based on a received calibration parameter of the tracking sensor integration system 440, the IMU 480 may adjust one or more IMU parameters (e.g., sample rate). In some embodiments, certain calibration parameters of the tracking sensor integration system 440 cause the IMU 480 to update an initial position of the reference point of the wearable garment so it corresponds to a next calibrated position of the reference point of the wearable garment. Updating the initial position of the reference point of the wearable garment as the next calibrated position of the reference point of the wearable garment helps reduce accumulated error associated with the determined estimated position. The configuration and operation of the IMU 480 is similar to the IMU 140 of the fabric glove 100 of FIG. 1 and to the IMU 140 of the tracking sensor integration system 200 of FIG. 2.

The imaging device 435 generates imaging data in accordance with calibration parameters received from the HMD console 410. Imaging data (herein also referred to as "imaging information") of the HMD headset includes one or more images showing observed positions of the locators 420 associated with the HMD headset 405 that are detectable by the imaging device 435. Similarly, imaging data of the wearable garment and the tracking sensor integration system 440 includes one or more images showing observed positions of the locators 470 that are detectable by the imaging device 435. In one aspect, the imaging data includes one or more images of both the HMD headset 405 and the wearable garment. The imaging device 435 may include one or more cameras, one or more video cameras, any other device capable of capturing images including one or more of the locators 420 and 470, or any combination thereof. Additionally, the imaging device 435 may include one or more filters (e.g., used to increase signal to noise ratio). The imaging device 435 is configured to detect light emitted or reflected from locators 420 and 470 in a field of view of the imaging device 435. In embodiments where the locators 420 and 470 include passive elements (e.g., a retroreflector), the imaging device 435 may include a light source that illuminates some or all of the locators 420 and 470, which retro-reflect the light towards the light source in the imaging device 435. Imaging data is communicated from the imaging device 435 to the HMD console 410, and the imaging device 435 receives one or more calibration parameters from the HMD console 410 to adjust one or more imaging parameters (e.g., focal length, focus, frame rate, ISO, sensor temperature, shutter speed, aperture, etc.). In some embodiments, the imaging device 435 may acquire sensor data related to position of the fabric glove 100 that represent ground truth data for a pose of user's hand.

The HMD console 410 provides media to the HMD headset 405 for presentation to the user in accordance with information received from one or more of: the imaging device 435, the HMD headset 405, and the tracking sensor integration system 440. In the example shown in FIG. 4, the HMD console 410 includes an application store 445, a tracking module 450, and a HMD engine 455. Some embodiments of the HMD console 410 have different modules than those described in conjunction with FIG. 4. Similarly, the functions further described below may be distributed among components of the HMD console 410 in a different manner than is described here.

The application store 445 stores one or more applications for execution by the HMD console 410. An application is a group of instructions, that when executed by a processor, generates content for presentation to the user. Content generated by an application may be in response to inputs received from the user via movement of the HMD headset 405 or the wearable garment where the various tracking sensors of the tracking sensor integration system 440 are integrated. Examples of applications include: gaming applications, conferencing applications, video playback applications, or other suitable applications.

The tracking module 450 calibrates the HMD system 400 using one or more calibration parameters and may adjust one or more calibration parameters to reduce error in determination of the position of the HMD headset 405 and/or the wearable garment where the various tracking sensors of the tracking sensor integration system 440 are integrated.

The tracking module 450 tracks movements of the HMD headset 405 using imaging information of the HMD headset 405 from the imaging device 435. The tracking module 450 determines positions of a reference point of the HMD headset 405 using observed locators from the imaging information and a model of the HMD headset 405. The tracking module 450 also determines positions of a reference point of the HMD headset 405 using position information from the IMU information of the HMD headset 405. Additionally, in some embodiments, the tracking module 450 may use portions of the IMU information, the imaging information, or some combination thereof of the HMD headset 405, to predict a future location of the headset 405. The tracking module 450 provides the estimated or predicted future position of the HMD headset 405 to the HMD engine 455.

In addition, the tracking module 450 tracks movements of the wearable garment where the various tracking sensors of the tracking sensor integration system 440 are integrated using imaging information of the wearable garment and the tracking sensor integration system 440 from the imaging device 435. The tracking module 450 determines positions of a reference point of the wearable garment using observed locators from the imaging information and a model of the wearable garment. The tracking module 450 also determines positions of a reference point of the wearable garment using position information from the IMU information of the wearable garment. Additionally, in some embodiments, the tracking module 450 may use portions of information obtained by the elastomeric stretch sensors 460, portions of the IMU information, the imaging information, or some combination thereof of the tracking sensor integration system 440, to predict a future location of the wearable garment where the tracking sensor integration system 440 is integrated. The tracking module 450 provides the estimated or predicted future position of the wearable garment and the user's hand to the HMD engine 455.

The HMD engine 455 executes applications within the system environment 400 and receives position information, acceleration information, velocity information, predicted future positions, or some combination thereof of the HMD headset 405 from the tracking module 450. Based on the received information, the HMD engine 455 determines content to provide to the HMD headset 405 for presentation to the user. For example, if the received information indicates that the user has looked to the left, the HMD engine 455 generates content for the HMD headset 405 that mirrors the user's movement in a virtual environment. Additionally, the HMD engine 455 performs an action within an application executing on the HMD console 410 in response to detecting a motion of the wearable garment where the tracking sensor integration system 440 is integrated and provides feedback to the user that the action was performed. In one example, the HMD engine 455 instructs the HMD headset 405 to provide visual or audible feedback to the user. In another example, the HMD engine 455 instructs the tracking sensor integration system 440 to provide information about an estimated pose of a user's hand to the HMD console 410.

In addition, the HMD engine 455 receives position information, acceleration information, velocity information, predicted future positions, or some combination thereof of the wearable garment from the tracking module 450 and determines whether a virtual touch event occurred. A virtual touch event herein refers to an event of a user contacting a virtual object in a virtual space. For example, an image of a virtual object is presented to the user on the HMD headset 405. Meanwhile, the HMD engine 455 collectively analyzes positions of multiple sensors of the tracking sensor integration system 440 through the tracking module 450, and generates a three dimensional mapping of the wearable garment where the tracking sensor integration system 440 is integrated describing the position and the shape of the wearable garment. The three dimensional mapping of the wearable garment describes coordinates of various parts of the wearable garment in a virtual space corresponding to physical positions of the parts of the wearable garment in reality. Responsive to the user performing an action to grab the virtual object or the user being contacted by the virtual object, the HMD engine 455 determines that the virtual touch event occurred.

In one embodiment, the HMD engine 455 compares coordinates of a virtual object and a coordinate of the wearable garment in a virtual space to determine whether a virtual touch event occurred. The HMD engine 455 obtains a coordinate of the virtual object in a virtual space, in accordance with an image presented via the HMD headset 405. Additionally, the HMD engine 455 obtains a coordinate of the wearable garment corresponding to a physical position of the wearable garment from the tracking module 450 or the three dimensional mapping of the wearable garment. Then, the HMD engine 455 compares the coordinate of the virtual object in the virtual space and the coordinate of the wearable garment in the virtual space. For example, if two coordinates of the virtual object and the wearable garment overlap or are approximate to each other within a predetermined distance for a predetermined amount of time (e.g., 1 second), the HMD console 410 determines the virtual touch event occurred.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A tracking sensor integration system comprising:
   a plurality of sensors attached to a wearable garment placed on a user's hand, the plurality of sensors configured to obtain sensor data during a plurality of time frames; and
   a controller interfaced with the plurality of sensors, the controller configured, for each time frame of the plurality of time frames, to:
      update a measurement gain for a current time frame of the plurality of time frames based on a portion of the sensor data collected for the current time frame and a time frame preceding the current time frame and a value of the measurement gain for the time frame preceding the current time frame,
      determine prediction for a pose of the user's hand for the current time frame using sensor data collected for the current time frame and a plurality of estimation parameters for the current time frame,
      update the estimation parameters for the current time frame, based in part on the updated measurement gain and the prediction for the pose of the user's hand, the estimation parameters representing weighted regressors describing a direct relation between the sensor data and the pose of the user's hand, and
      determine an estimated pose for the user's hand for the current time frame, based in part on the updated estimation parameters and the sensor data collected for the current time frame.

2. The system of claim 1, wherein the controller is further configured to:
   update a measurement covariance based in part on the measurement gain and the sensor data collected for the current time frame; and
   update the measurement gain for a time frame following the current time frame, based on the updated measurement covariance and sensor data collected by the plurality of sensors during the time frame following the current time frame.

3. The system of claim 1, wherein the controller is further configured to:
   determine a plurality of weights based on a defined accuracy of estimating the pose of the user's hand;
   apply the weights to the sensor data collected for the current time frame to obtain weighed sensor data; and
   calculate the measurement gain based in part on the weighted sensor data.

4. The system of claim 1, wherein the controller is further configured to:
   determine measurement data related to the pose of the user's hand using the sensor data collected for the current time frame;
   calculate a difference between the measurement data and the prediction for the pose of the user's hand; and
   update the estimation parameters for the current time frame based on the measurement gain and the difference.

5. The system of claim 1, wherein the controller is further configured to:
   provide information about the estimated pose for the user's hand to a console for updating a visual presentation of the user's hand on an electronic display of a head-mounted display.

6. The system of claim 1, wherein the controller is further configured to:
   replace, in a memory coupled to the controller, information about the estimation parameters for the time frame preceding the current time frame with information about the updated estimation parameters for the current time frame; and
   replace, in the memory, information about sensor data collected by the plurality of sensors elements during the time frame preceding the current time frame with information about the sensor data collected for the current time frame.

7. The system of claim 1, wherein the controller is further configured to:
   determine a vector of regressors for the current time frame based on the sensor data collected for the current time frame; and
   determine the estimated pose for the user's hand, based on the updated estimation parameters and the vector of regressors.

8. The system of claim 7, wherein the controller is further configured to:

determine the prediction for the pose of the user's hand for the current time frame, based on the vector of regressors for the current time frame and the estimation parameters for the current time frame.

9. The system of claim 1, wherein the plurality of sensors are selected from a group consisting of optical sensors, magnetic sensing sensors, radio frequency (RF) based sensors, a position sensor, and an inertial measurement unit (IMU).

10. A tracking sensor integration system, the system configured to:
obtain sensor data during a plurality of time frames by a plurality of sensors attached to a wearable garment placed on a portion of a user's body;
update a measurement gain for a current time frame of the plurality of time frames based on a portion of the sensor data collected for the current time frame and a time frame preceding the current time frame and a value of the measurement gain for the time frame preceding the current time frame;
determine prediction for a pose of the portion of the user's body for the current time frame using sensor data collected for the current time frame and a plurality of estimation parameters for the current time frame;
update the estimation parameters for the current time frame, based in part on the updated measurement gain and the prediction for the pose of the portion of the user's body, the estimation parameters representing weighted regressors describing a direct relation between the sensor data and the pose of the user's hand; and
determine an estimated pose for the portion of the user's body for the current time frame, based in part on the updated estimation parameters and the sensor data collected for the current time frame.

11. The system of claim 10, wherein the system is further configured to:
update a measurement covariance based in part on the measurement gain and the sensor data collected for the current time frame; and
update the measurement gain for a time frame following the current time frame, based on the updated measurement covariance and sensor data collected by the plurality of sensors during the time frame following the current time frame.

12. The system of claim 10, wherein the system is further configured to:
determine measurement data related to the pose of the portion of the user's body using the sensor data collected for the current time frame;
calculate a difference between the measurement data and the prediction for the pose of the portion of the user's body; and
update the estimation parameters for the current time frame based on the measurement gain and the difference.

13. The system of claim 10, wherein the system is further configured to:
replace, in a memory of the system, information about the estimation parameters for the time frame preceding the current time frame with information about the updated estimation parameters for the current time frame; and
replace, in the memory, information about sensor data collected by the plurality of sensors elements during the time frame preceding the current time frame with information about the sensor data collected for the current time frame.

14. The system of claim 10, wherein the system is further configured to:
determine a vector of regressors for the current time frame based on the sensor data collected for the current time frame; and
determine the estimated pose for the portion of the user's body, based on the updated estimation parameters and the vector of regressors.

15. The system of claim 14, wherein the system is further configured to:
determine the prediction for the pose of the portion of the user's body for the current time frame, based on the vector of regressors for the current time frame and the estimation parameters for the current time frame.

16. A method comprising:
obtaining sensor data during a plurality of time frames by a plurality of sensors attached to a wearable garment placed on a portion of a user's body;
updating a measurement gain for a current time frame of the plurality of time frames based on a portion of the sensor data collected for the current time frame and a time frame preceding the current time frame and a value of the measurement gain for the time frame preceding the current time frame;
determining prediction for a pose of the portion of the user's body for the current time frame using sensor data collected for the current time frame and a plurality of estimation parameters for the current time frame;
updating the estimation parameters for the current time frame, based in part on the updated measurement gain and the prediction for the pose of the portion of the user's body, the estimation parameters representing weighted regressors describing a direct relation between the sensor data and the pose of the user's hand; and
determining an estimated pose for the portion of the user's body for the current time frame, based in part on the updated estimation parameters and the sensor data collected for the current time frame.

17. The method of claim 16, further comprising:
determining a plurality of weights based on a defined accuracy of estimating the pose of the portion of the user's body;
applying the weights to the sensor data collected for the current time frame to obtain weighed sensor data; and
calculating the measurement gain based in part on the weighted sensor data.

18. The method of claim 16, further comprising:
determining measurement data related to the pose of the portion of the user's body using the sensor data collected for the current time frame;
calculating a difference between the measurement data and the prediction for the pose of the portion of the user's body; and
updating the estimation parameters for the current time frame based on the measurement gain and the difference.

19. The method of claim 16, further comprising:
determining a vector of regressors for the current time frame based on the sensor data collected for the current time frame; and
determining the estimated pose for the portion of the user's body, based on the updated estimation parameters and the vector of regressors.

20. The method of claim 19, further comprising:
determine the prediction for the pose of the portion of the user's body for the current time frame, based on the vector of regressors for the current time frame and the estimation parameters for the current time frame.

* * * * *